(12) United States Patent
Steinmacher-Burow

(10) Patent No.: US 10,599,590 B2
(45) Date of Patent: *Mar. 24, 2020

(54) UNIFORM MEMORY ACCESS ARCHITECTURE

(71) Applicant: International Business Machines Corporation, Armonk, NY (US)

(72) Inventor: Burkhard Steinmacher-Burow, Esslingen am Neckar (DE)

(73) Assignee: International Business Machines Corporation, Armonk, NY (US)

( * ) Notice: Subject to any disclaimer, the term of this patent is extended or adjusted under 35 U.S.C. 154(b) by 345 days.

This patent is subject to a terminal disclaimer.

(21) Appl. No.: 15/365,005

(22) Filed: Nov. 30, 2016

(65) Prior Publication Data

US 2018/0150418 A1    May 31, 2018

(51) Int. Cl.
| | |
|---|---|
| *G06F 12/00* | (2006.01) |
| *G06F 13/16* | (2006.01) |
| *G06F 12/0817* | (2016.01) |
| *G06F 13/40* | (2006.01) |
| *G06F 13/42* | (2006.01) |
| *G06F 3/06* | (2006.01) |

(52) U.S. Cl.
CPC .......... *G06F 13/1673* (2013.01); *G06F 3/061* (2013.01); *G06F 3/0656* (2013.01); *G06F 3/0683* (2013.01); *G06F 12/0817* (2013.01); *G06F 13/4068* (2013.01); *G06F 13/4282* (2013.01); *G06F 2212/1016* (2013.01); *Y02D 10/14* (2018.01); *Y02D 10/151* (2018.01)

(58) Field of Classification Search
CPC ............. G06F 13/1673; G06F 13/4068; G06F 13/4282; G06F 3/0656; G06F 3/0683; G06F 12/0817; G06F 2212/621
See application file for complete search history.

(56) References Cited

U.S. PATENT DOCUMENTS

| | | |
|---|---|---|
| 6,594,769 B2 | 7/2003 | Walton et al. |
| 7,574,567 B2 | 8/2009 | Wyman |
| 8,307,122 B2 | 11/2012 | Hu et al. |

(Continued)

OTHER PUBLICATIONS

Steinmacher-Burow, Burkhard, "Uniform Memory Access Architecture", U.S. Appl. No. 15/897,506, filed Feb. 15, 2018, 40 pages.

(Continued)

*Primary Examiner* — Prasith Thammavong
(74) *Attorney, Agent, or Firm* — Denis Doehler; Brian M. Restauro

(57) ABSTRACT

Disclosed aspects relate to a computer system having a plurality of processor chips and a plurality of memory buffer chips and a methodology for operating the computer system. The memory buffer chips may be communicatively coupled to at least one memory module which can be configured for storing memory lines and assigned to the memory buffer chip. The processor chips can include a cache configured for caching memory lines. The processor chips may be communicatively coupled to the memory buffer chips via a memory-buffer-chip-specific bidirectional serial point-to-point communication connection. The processor chips can be configured for transferring memory lines between the cache of the processor chip and the memory modules via the respective memory-buffer-chip-specific bidirectional serial point-to-point communication connection.

20 Claims, 8 Drawing Sheets

(56) References Cited

U.S. PATENT DOCUMENTS

| | | |
|---|---|---|
| 8,776,050 B2 | 7/2014 | Plouffe et al. |
| 9,672,180 B1 | 6/2017 | Morshed et al. |
| 9,734,063 B2 | 8/2017 | Novakovic et al. |
| 10,169,087 B2 | 1/2019 | Accapadi et al. |
| 2003/0159081 A1 | 8/2003 | MacLellan et al. |
| 2007/0061518 A1 | 3/2007 | Gotoh |
| 2010/0318741 A1 | 12/2010 | Scott et al. |
| 2010/0325308 A1 | 12/2010 | Keckler et al. |
| 2011/0010468 A1 | 1/2011 | Hu et al. |
| 2016/0070658 A1 | 3/2016 | Woolley |
| 2018/0129606 A1 | 5/2018 | Steinmacher-Burow |

OTHER PUBLICATIONS

Appendix P—List of IBM Patents or Patent Applications Treated as Related, Filed herewith, 2 Pages.

Abts, Dennis, et al.; "High Performance Datacenter Networks: Architectures, Algorithms, and Opportunities"; Synthesis Lectures on Computer Architecture; <http://bnrg.cs.berkeley.edu/~randy/Courses/CS294.S13/2.2.pdf>.

Gauthier, Claude; "Overcoming 40G/100G SerDes design and implementation challenges"; EE Times; <http://www.eetimes.com/document.asp?doc_id=1279194>.

Andreyev, Alexey; "Introducing data center fabric, the next-generation Facebook data center network"; Facebook Code; <code.facebook.com/posts/360346274145943/introducing-data-center-fabric-the-next-generation-facebook-data-center-network>.

Sun Microsystems Federal, Inc.; "Sun Enterprise 10000 System Overview Manual"; <http://docs.oracle.com/cd/E19957-01/805-0310-13/805-0310-13.pdf>.

Charlesworth, Alan; "STARFIRE: Extending the SMP Envelope"; IEEE Software; <http://www.cc.gatech.edu/~bader/COURSES/UNM/ece637-Fall2003/papers/Cha98.pdf>.

Bell, Gordon, et al.; "High Performance Computing: Crays, Clusters, and Centers. What Next?"; Microsoft; <cseweb.ucsd.edu/~carter/260/260class02.pdf>.

Tang, Lingjia, et al.; "The Impact of Memory Subsystem Resource Sharing on Datacenter Applications"; <http://static.googleusercontent.com/media/research.google.com/en//pubs/archive/37124.pdf>.

Intel Corporation; "Intel E7525 Memory Controller Hub (MCH) Chipset Datasheet"; <http://www.intel.com/content/dam/doc/datasheet/e7525-memory-controller-hub-datasheet.pdf>.

Cisco; "Cisco Nexus 9500 Platform Common Equipment Datasheet"; <http://www.cisco.com/c/en/us/products/collateral/switches/nexus-9000-series-switches/datasheet-c78-729404.pdf>.

UNIFORM MEMORY ACCESS ARCHITECTURE

BACKGROUND

This disclosure relates generally to computer systems and, more particularly, relates to computer system having a plurality of processor chips and memory modules.

Computer systems may be based on a multiprocessing architecture comprising two or more processor chips for performing fast processor operations. Retrieving data and instructions in general may take a significant amount of time relative to the average time required for executing the instructions and processing the data by the processor chips. The memory access architecture of multiprocessor computer systems is may be based on a non-uniform memory access (NUMA). Each processor chip may have its own local memory. In order to enable high-speed processor operations, improvement in memory access speed in multiprocessor computer systems may be desired.

SUMMARY

Aspects of the disclosure relate to a computer system with a set of processor chips which comprises a plurality of processor chips. The computer system can include a set of memory buffer chips with a plurality of memory buffer chips. The memory buffer chips are communicatively coupled to at least one memory module which is configured for storing memory lines and which is assigned to the memory buffer chip. The processor chips may include a cache which is configured for caching memory lines. The processor chips may be communicatively coupled to each of the memory buffer chips via a memory-buffer-chip-specific bidirectional serial point-to-point communication connection. The processor chips can be configured for transferring memory lines between the cache of the processor chip and the memory modules via the respective memory-buffer-chip-specific bidirectional serial point-to-point communication connection.

Aspects of the disclosure relate to a method of operating a computer system with a set of processor chips having a plurality of processor chips and a set of memory buffer chips having a plurality of memory buffer chips. The memory buffer chips is communicatively coupled to at least one memory module which is configured for storing memory lines and which is assigned to the memory buffer chip. The processor chips may include a cache which is configured for caching memory lines. The processor chips can be communicatively coupled to the memory buffer chips via a memory-buffer-chip-specific bidirectional serial point-to-point communication connection. The processor chips may be configured for transferring memory lines between the cache comprised by the processor chip and the memory modules via the respective memory-buffer-chip-specific bidirectional serial point-to-point communication connection. Aspects can include writing a memory line provided by the cache of a first one of the processor chip to the at least one memory module assigned to one of the memory buffer chips by directly accessing the memory buffer chip via the memory-buffer-chip-specific bidirectional serial point-to-point communication connection between the first processor chip and the memory buffer chip. Aspects can include writing a memory line provided by the cache of a second one of the processor chip to the at least one memory module assigned to the memory buffer chip by directly accessing the memory buffer chip via the memory-buffer-chip-specific bidirectional serial point-to-point communication connection between the second processor chip and the memory buffer chip.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
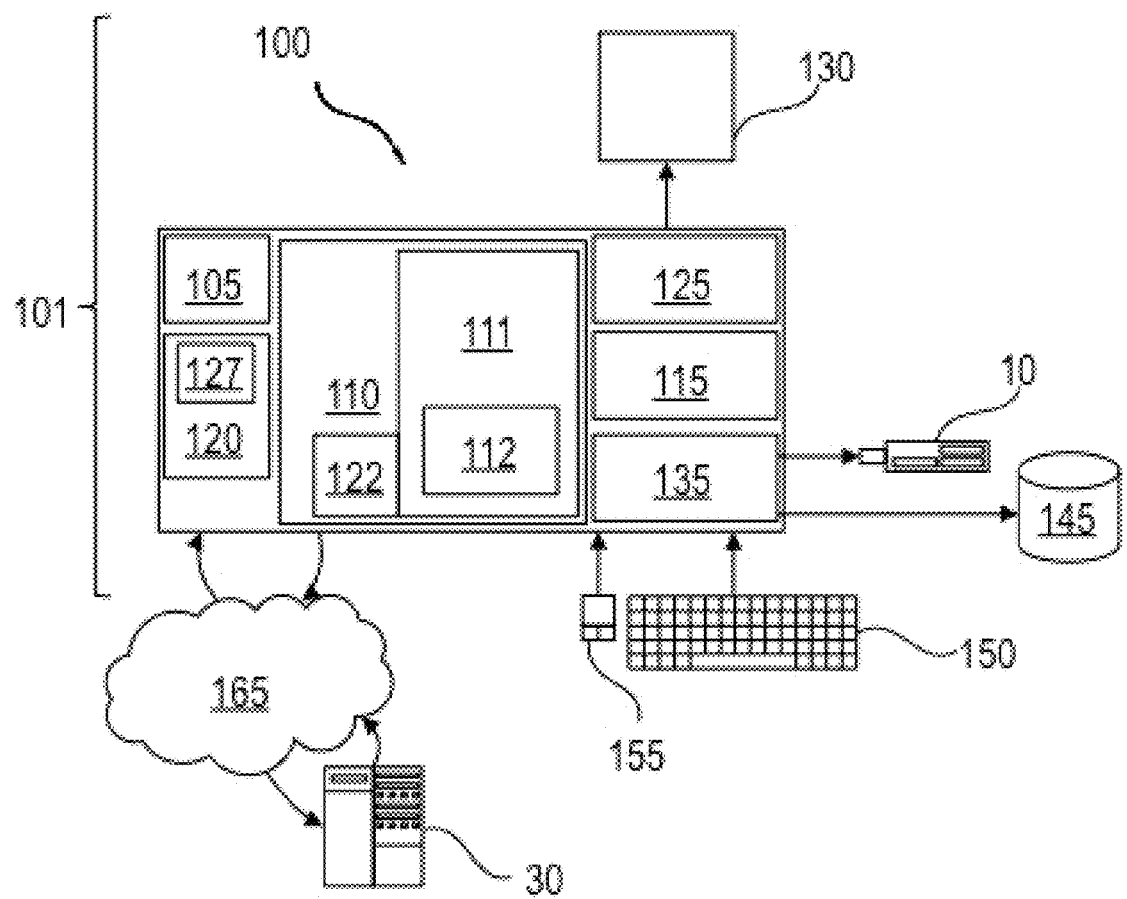
FIG. 1 depicts an exemplary system suited for implementing embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The descriptions of the various embodiments of the present disclosure are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect that they provide a multiprocessor computer system with a uniform memory access (UMA) architecture. In a UMA architecture, all processor chips in the UMA share the physical memory uniformly. According to embodiments each processor chip is communicatively coupled to each memory buffer chip and vice versa. Access time to a memory location may thus be independent of which processor chip makes the request or which memory module contains the transferred data. A UMA architecture may for example be used to speed up the execution of a single large program in time-critical applications.

Embodiments may have the beneficial effect that a failure of one of the processor chips may efficiently be compensated by the remaining processor chips which still have access to all the memory modules. In case of a NUMA architecture, memory modules local to the broken processor chip may not be accessible anymore.

A processor may comprise two or more independent actual processing units, i.e. cores, which are the units that read and execute program instructions. The multiple cores may run multiple instructions at the same time, increasing overall speed for programs amenable to parallel computing. The cores may for example be integrated onto a single integrated circuit die or onto multiple dies in a single chip package. A memory buffer chip may refer to an electronic circuit on a chip which manages the access to one or more memory modules and may establish coherence for the data stored in the memory modules.

The memory modules communicatively coupled and assigned to a memory buffer chip may be local to the memory buffer chip, i.e. they may only be accessed via the respective memory buffer chip. The memory modules may further be local to the memory buffer chip.

Using thin communication connections in form of serial communication connects may allow processor chips to have a point-to-point (p2p) connection to a large number of memory buffer chips, e.g. 100 or more. Today's high-speed signaling allows such a thin connection, since high-enough speed adds low-enough serialization delay for transfer of a memory line over a thin connection.

Thus, using serial communication connections which are thin may allow to implement fewer pins for data transfer between processor chips and memory buffer chips relative to generally used non-uniform memory access architectures and to support greater memory capacities and greater memory bandwidth. Increasing pin bandwidth may allow for using many serial point-to-point communication connections, while still ensuring high-speed data transfer of a single memory line. By using serial communication connections each established between a port of a processor chip and a port of a memory buffer chip, the number of memory buffer chips communicatively coupled to each processor chip may be increased resulting in a paradigm shift to many-ported processor chips and memory buffer chips. The increase of serial bandwidth relative to memory line size allows memory interconnect built from serial point-to-point communication connections. The transfer of a memory line from a memory buffer chip to a processor chip has first to be completed before the processor chip execution can use that memory line. However, considering for example an up-to-date transfer rate of 25 Gbit/s, the serialization latency for a 64 B (512b) memory line may be reduced to approximately 20 ns. Thus, allowing for implementing efficient serial communication providing high speed transfer.

According to embodiments, each of the bidirectional serial point-to-point communication connections comprises a single differential signaling pair of conductors for each direction of communication. Embodiments may have the beneficial effect that serial point-to-point communication connections implementing differential signaling may be provided. By implementing differential signaling data may be transmitted between a processor chip and a memory buffer chip using two complimentary signals. The same electrical signal is sent as a differential pair of signals, each signal being sent in its own conductor. The pair of conductors used for differential signaling may for example be wires or tracers. The communication may be a bidirectional communication sending data from the processor chip to the memory buffer chip and vice versa. Therefore, the serial point-to-point communication connection may comprise two pairs of conductors. Provided that the source and the receiver impedances are equal, external electromagnetic interference tends to affect both conductors of the pair of conductors identically. Since the receiver only detects the difference between the two signals sent via the two conductors, electromagnetic noise may be reduced.

According to embodiments, each of the bidirectional serial point-to-point communication connections comprises a single single-ended signaling conductor for each direction of communication. Embodiments may have the beneficial effect that they allow to implement single-ended signaling. Single-ended signaling may use one conductor with a reference, i.e. ground conductor. For example, all processor chips and memory chips may share a common ground. Bidirectional communication may be implemented by providing a single conductor for each direction of communication. A minimum of two conductors may be used for implementing a serial point-to-point communication connection. Thus, using single-ended signaling may have the advantage of using fewer conductors.

According to embodiments, each of the memory buffer chips being communicatively coupled to a plurality of the memory modules. Embodiments may have the beneficial effect that large memory capacity may be provided via each of the memory buffer chips.

According to embodiments, the set of processor chips is divided into a group of processor chip subsets. Each processor chip subset comprises one or more of the processor chips. Each processor chip subset is arranged on a subset-specific processor carrier element. The set of memory buffer chips is divided into a group of memory buffer chip subsets. Each memory buffer chip subset comprises one or more of the memory buffer chips. Each memory buffer chip subset is arranged on a subset-specific buffer carrier element. Each processor carrier element comprises for each memory buffer carrier element a first connector assigned to a second connector of the memory buffer carrier element. Each first connector is configured for being plugged together with the assigned second connector and for establishing all the bidirectional serial point-to-point communication connections between the one or more processor chips arranged on the processor carrier element of the first connector and the one or more memory buffer chips arranged on the carrier element of the second connector. The group of processor chip subsets may comprise one or more processor chip subsets, while the group of memory buffer chip subsets may comprise one or more buffer chip subsets.

Embodiments may have the beneficial effect that a simple space-saving setup may be provided for implementing a uniform memory access architecture. For example, a four-socket implementation may comprise four processor carrier elements. Each process carrier element may comprise one processor chip and eight buffer-carrier-specific connectors. Furthermore, eight memory buffer carrier elements may be provided, each memory buffer carrier element comprising four memory buffer chips and four processor-carrier-specific connectors. In total 4 processor chips and 32 memory buffer chips may be provided. The processor chip may be communicatively coupled to each of the buffer-carrier-specific connectors, while each of the memory buffer chips may be communicatively coupled to each of the processor-carrier-specific connectors of the respective memory buffer carrier element. The size of the system may easily be reduced and adapted to smaller memory capacity or processing capacity requirements by removing one or more memory buffer carrier elements and processor carrier elements, respectively.

A 16 socket system may for example be implemented analogously by providing eight processor carrier elements, each comprising two processor chips and 16 connectors. Each of the two processor chips may be communicatively coupled to each of the 16 buffer-carrier-specific connectors. Further, 16 memory buffer carrier elements may be provided with each comprising eight memory buffer chips and eight processor-carrier-specific connectors.

According to embodiments, the carrier elements may be provided in form of cards. According to embodiments, the cards may be arranged in a cross-blade chassis with horizontal processor cards or boards inserted from the front and vertical memory cards or boards inserted from the rear, where each processor board connector is plugged directly into a connector of each memory board.

According to embodiments, the processor carrier elements may be provided vertically arranged parallel above each other, while the memory buffer carrier elements may be provided horizontally and parallel next to each other. The planes of the processor carrier elements may thus be oriented perpendicularly to the planes of the memory buffer carrier elements.

According to embodiments, all processor chips may be arranged on one motherboard, i.e. one processor carrier element. The memory buffer carrier elements, e.g. memory boards, may be plugged into the motherboard.

Embodiments may have the beneficial effect to allow the computer system to be partially populated with processor chips or memory buffer chips. Partial population may be due to a failed chip or a chip not present. So for a physical system constructed for N processor chips, only 1 to N of the processor chips might be present and functioning. Likewise, for a physical system constructed for M memory buffer chips, only 1 to M of the memory buffer chips might be present, though typically half or more of the memory buffer chips may be present.

According to embodiments, each of the processor chip subsets comprises the same number of processor chips. According to embodiments, each of the memory buffer chip subsets comprises the same number of memory buffer chips. Embodiments may have the beneficial effect that they allow for a modular setup enabling a simple adjustment of the system to different requirements regarding the memory capacity and processing capacities to be provided.

According to embodiments, each of the processor chips comprises a memory interface for communicating with the memory buffer chips via the bidirectional serial point-to-point communication connections. The memory interface is provided with a parallel-to-serial converter for converting parallel data signals which are provided by the processor chip to serial data signals which are transferred via the bidirectional serial point-to-point communication connections to the memory buffer chips. The memory interface is further provided with a serial-to-parallel converter for converting serial data signals which are provided by the memory buffer chips via the bidirectional serial point-to-point communication connections to parallel data signals which are provided by the memory interface to the processor chip.

According to embodiments, each of the memory buffer chips comprises a processor interface for communicating with the processor chips via the bidirectional serial point-to-point communication connections. The processor interface is provided with a parallel-to-serial converter for converting parallel data signals which are provided by the memory buffer chip to serial data signals which are transferred via the bidirectional serial point-to-point communication connections to the processor chips. The processor interface is further provided with a serial-to-parallel converter for converting serial data signals which are provided by the processor chips via the bidirectional serial point-to-point communication connections to parallel data signals which are provided by the processor interface to the memory buffer chip.

Embodiments may have the beneficial effect that they allow for coupling a large number of memory buffer chips with each processor chip. Thus, each processor chip may be enabled to directly access each of the memory buffer chips, thereby increasing the access speed. For example, the bandwidth on both sides of the serial-to-parallel converter as well as on both sides of the parallel-to-serial converter may be the same, such that the serial connections may have a proportionally higher signal speed relative to the parallel connections. For example, the data transfer rate of the parallel communication connections may be 16 bits at 1 Gbit/s, while the data transfer rate of the serial communication connections may be 1 bit at 16 Gbit/s.

According to embodiments, at least one of the memory buffer chips comprises a cache which is configured for caching memory lines stored in the at least one memory module assigned to the memory buffer chip. According to embodiments, each of the memory buffer chips comprises a cache which is configured for caching memory lines stored in the at least one memory module assigned to the memory buffer chip. Embodiments may have the beneficial effect that copies of memory lines accessed by one or more of the processor chips may be cached in the cache of the memory buffer chips. When a processor chip tries to access one of these cached memory lines the respective memory line may be accessed directly in the cache of the memory buffer chip. Thus, it is not required to access the memory module comprising the respective memory line via the memory buffer chip. Thereby, the time required for accessing a requested memory line may further be reduced.

According to embodiments, each of the memory buffer chips comprises a coherence directory and is configured for implementing the directory-based coherence over the processor chip caches for memory lines stored in the at least one memory module assigned to the memory buffer chip. Embodiments may have the beneficial effect that the coherence directories may comprise entries for each of the memory lines stored in the memory modules local to the respective memory buffer chip. The entries of the coherence directories may indicate which processor chip has currently cached a copy of the respective memory line and/or the type of copy cached. The copy may for example be an exclusive write copy or a shared read copy. Due to the multiprocessor architecture of the computer system, it is possible that many copies of one memory line are cached by a plurality of different processor chips. When one of the copies, i.e. an exclusive write copy, is modified by one of the multiprocessor chips, the other multiprocessor chips as well as the memory module comprising the original version of the memory line have to be invalidated or modified as well. The coherence may protocol the processing of the different copies and ensure that changes are propagated throughout the system in a timely fashion.

In a directory-based system, the data sharing may be controlled based on a common directory that maintains the coherence between caches. The directory acts as a filter through which the processor chip must ask permission to load an entry, i.e. a memory line, from the memory module to its cache. When an entry is changed, the directory ensures that other caches with the respective entry are either updated or invalidated. Coherence may be maintained according to a specific consistency model, e.g. the sequential consistency model, the release consistency model or the weak consistency model.

According to embodiments, the system is configured for transferring a memory mapped I/O command issued by a first one of the processor chips for an I/O device communicatively coupled to a second one of the processor chips. The memory mapped I/O command is transferred from the first processor chip to the second processor chip via one of the memory buffer chips. Embodiments may have the beneficial effect that extra complexity introduced by port I/O may be avoided resulting in less internal logic being required by the processor chips which therefore may be faster, easier to build, consuming less power and may be physically smaller. Further, since regular memory instructions may be used to address devices, all of the addressing modes of the processor chips may be available for the I/O as well as the memory and instructions that perform an arithmetic logic unit (ALU) operation directly on a memory operant may be used with I/O device registers as well.

Memory-mapped I/O uses the same address and bus to address both memory and I/O devices, i.e. the memory and registers of the I/O devices are mapped to address values. Thus, the processor chip instructions used to access the memory may as well be used for accessing devices. Each I/O device may monitor the processor chip address bus and respond to any processor chip access on an address assigned to the respective device, connecting the data bus to the desired hardware register of the device. In order to accommodate the I/O devices, areas of the addresses used by the process chips may be reserved for I/O and must not be available for normal physical memory. The respective reservation may be permanent or temporary.

According to embodiments, the I/O device is a peripheral component interconnect express device. Embodiments may have the beneficial effect that a high-speed serial computer expansion bus standard may be used resulting in higher maximum system bus throughput, lower I/O pin count and smaller physical footprint, better performance scaling for bus devices, a more detailed error detection and reporting mechanism, as well as native hot-plug functionality.

According to embodiments, the number of memory buffer chips comprised by the set of memory buffer chips is larger than the number of processor chips comprised by the set of processor chips. Embodiments may have the beneficial effect that an equally large number of memory buffer chips and thus an even larger number of memory modules may be provided to each of the processor chips. Thereby, the memory capacity of the computer system provided to each of the processor chips may be significantly increased.

According to embodiments, each processor chip comprises a number of P ports. Each memory buffer chip comprises a number of H=P/X ports. P, H, and X are positive integers. Each port is configured for establishing a single one of the bidirectional serial point-to-point communication connections. The set of processor chips comprises H/Y processor chips. The set of memory buffer chips comprises P/Y memory buffer chips. Y is a positive integer selected from the interval of 1 to X to construct a pre-selected size of computer system. Each processor chip is communicatively coupled to each memory buffer chip by Y bidirectional serial point-to-point communication connections. Each bidirectional serial point-to-point communication connection is established via a pair of ports which comprises one of the P ports of the processor chip and one of the H ports of the memory buffer chip. Each pair of ports is exclusively assigned to the respective bidirectional serial point-to-point communication connection.

According to embodiments, for transferring any given one of the memory lines stored in one of the memory modules each processor chip uses a pre-defined one of its P ports which is communicatively coupled via one of the bidirectional serial point-to-point communication connections to a pre-defined one of the H ports of the memory buffer chip assigned to the memory module. The pre-defined ports are assigned to the address of the memory line in the memory module. A coherence directory of the memory buffer chip treats each one of the H ports of the memory buffer chip as an independent participant taking part in the transfer of the memory line. Thus, when indicating active participants by which the memory line is cached, the coherence directory indicates for the memory line at most H/Y active participants.

Embodiments may have the beneficial effect that for a given processor chip and memory buffer chip, the computer system constructed may easily be scaled up and down depending on the requirements regarding memory capacity and processing capacity. In a maximum scale system each processor chip may be communicatively coupled with each memory buffer chip via a single pair of ports, i.e. a single bidirectional serial point-to-point communication connection. In a system scaled down by a factor Y, each processor chip may be communicatively coupled with each memory buffer chip by Y serial point-to-point communication connections.

According to embodiments, the method further comprising: reading by the first processor chip a memory line stored in the memory module assigned to the memory buffer chip by directly accessing the memory buffer chip via the memory-buffer-chip-specific bidirectional serial point-to-point communication connection between the first processor chip and the memory buffer chip; reading by the second processor chip the memory line stored in the memory module assigned to the memory buffer chip by directly accessing the memory buffer chip via the memory-buffer-chip-specific bidirectional serial point-to-point communication connection between the second processor chip and the memory buffer chip.

Embodiments may have the beneficial effect that each memory module may be directly accessed by each processor chip via a single memory buffer chip for write as well as read operations.

The method for operating a computer system according to the present disclosure may be suitable for operating each of the embodiments described herein.

FIG. 1 shows an exemplary general system 100 suited for implementing embodiments of the present disclosure. It will be appreciated that the general system 100 described herein may be any type of computerized system comprising a plurality of plurality of processor chips, a plurality of memory buffer chips and a memory. The general system 100 may for example be implemented in form of a server, an embedded computerized system or general-purpose digital computer, such as a personal computer, workstation, minicomputer, or mainframe computer. The most general system 100 therefore includes a general-purpose computer 101.

The computer 101 may in particular be configured as a server, i.e. being optimized for a high speed data exchange with a large number of clients. The computer 101 may further provide a large processing capacity, i.e. CPU capacity, and/or large memory capacity. Furthermore, the software in memory 110 may comprise a server software application for processing a large number of requests by clients.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory modules (e.g., random access memory (RAM, such as DRAM, SRAM, SDRAM, etc.)) and non-volatile memory modules (e.g., ROM, erasable programmable read only memory (EPROM), electronically erasable programmable read only memory (EEPROM), or programmable read only memory (PROM)). Note that the memory 110 can have a distributed architecture, where additional modules are situated remote from one another, but can be accessed by the processor 105.

The software in memory 110 may include one or more separate programs, each of which comprises an ordered listing of executable instructions for implementing logical functions, notably functions involved in embodiments of this disclosure. In the example of FIG. 1, software in the memory 110 includes instructions 112 e.g. instructions to manage databases such as a database management system. The memory 110 may further comprise a query optimizer. The query optimizer may comprise instructions e.g. software instructions that when executed may provide a query execution plan for executing a given query.

The software in memory 110 shall also typically include a suitable operating system (OS) 111. The OS 111 essentially controls the execution of other computer programs, such as possibly software 112.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured for executing software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

Software 112 may further be provided stored on any computer readable medium, such as storage 120, for use by or in connection with any computer related system or method. The storage 120 may comprise a disk storage such as HDD storage.

Figure 2:
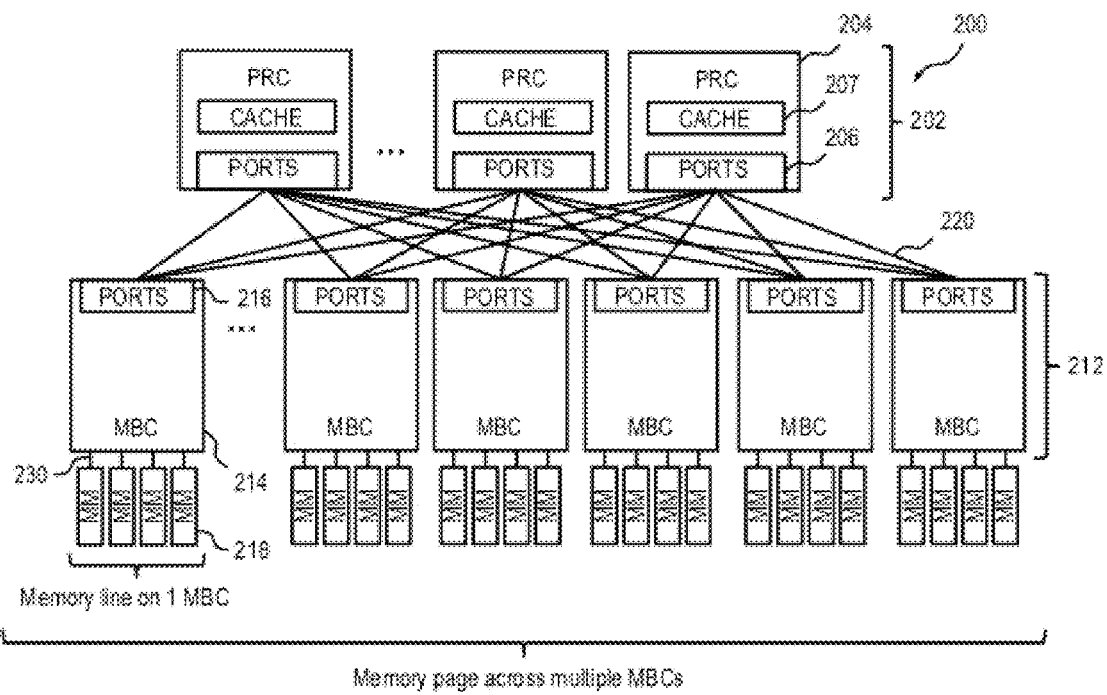
FIG. 2 depicts a schematic diagram illustrating a first exemplary uniform memory access architecture.

FIG. 2 shows an exemplary computer system 200 comprising a set of processor chips 202 comprising a plurality of processor chips (PRC) 204. Each processor chip 204 is provided with a plurality of ports 206. Each processor chip 204 may comprise a plurality of ports 206. Furthermore, each processor chip 204 may comprise one or more caches 207 for caching data to be processed.

The system may further comprise a set of memory buffer chips 212 comprising a plurality of memory buffer chips (MBC) 214. Each memory buffer chip 214 may comprise a plurality of ports 216. Furthermore, each of the memory buffer chips 214 may be communicatively coupled to one or more memory modules 218 local to the memory buffer chip 214. Each of the processor chips 204 is communicatively coupled to each of the memory buffer chips 214 via a memory-buffer-chip-specific bidirectional serial point-to-point communication connection 220. Each of the point-to-point communication connections 220 is established between a pair of ports, i.e. a first port 206 of a processor chip 204 and a second port 216 of a memory buffer chip 214.

Data is stored in form of memory lines which may be stored within one or more memory modules 218 local to the same memory buffer chip 214. A plurality of memory lines with contiguous addresses may form a memory page. The memory page may comprise memory lines stored within memory modules (MM) 218 local to different memory buffer chips 214. Therefore, a memory page may be distributed over a plurality of memory modules 218 local to different memory buffer chips 214.

The computer system 200 may for example comprise 16 processor chips 204 and 128 memory buffer chips 214. Each processor chip 204 may comprise 128 ports 206, thus being configured for establishing a maximum of 128 bidirectional serial point-to-point communication connections to 128 memory buffer chips 214. Each memory buffer chip may for example comprise 16 ports 216, thus being configured for establishing bidirectional serial point-to-point communication connections to a maximum of 16 processor chips 204.

The system 200 is based on a uniform memory access architecture, since each memory line stored in any of the memory modules 218 may accessed via the memory buffer chip 214 to which the respective memory module 218 is local as well as one of the serial point-to-point communication connections 220. This access is basically equal for all processor chips 204. In other words, apart from negligible differences due to different distances between some of the processor chips 204 and some of the memory buffer chips 214, the time required for an access of each of the memory lines may be equal for each of the processor chips 204.

The memory modules 218 may for example be provided by DRAM dual inline memory modules. The memory modules 218 may for example be provided in the form of phase change memory (PCM) or other memory storage technology. The connections 230 between the memory buffer chips 214 and the memory modules 218 may be provided by parallel communication connections. The serial point-to-point communication connections 220 may for example provide one bit at a signal rate of 10-30 Gbit/s, e.g. 16 or 25 Gbit/s. The parallel point-to-point communication connections 230 may for example provide 32 bits or 64 bits at a signal rate of 1 Gbit/s.

Figure 3:
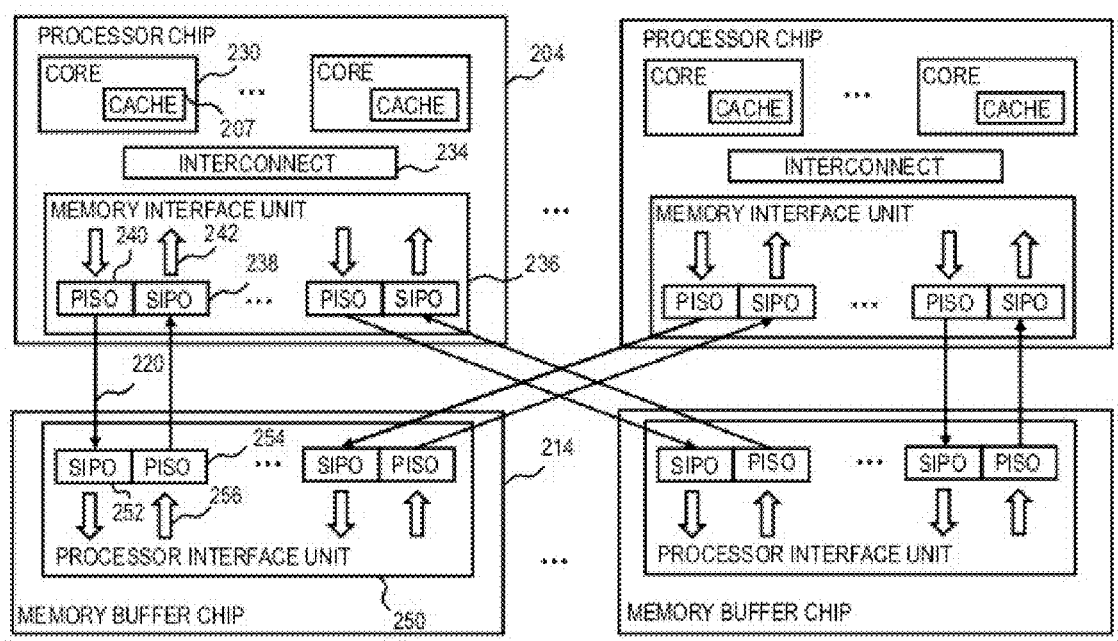
FIG. 3 depicts a schematic diagram illustrating a second exemplary uniform memory access architecture.

FIG. 3 shows details of the computer system 200 of FIG. 2. Each of the processor chips 204 may comprise a plurality of cores 230 provided in form of a multi-core processor architecture. Each of the cores 230 may comprise a cache 207 for caching memory lines to be processed by the respective core. Each processor chip 204 may comprise an interconnect module 234 for the internal data transfer as well as a memory interface unit 236. The memory interface unit 236 may be provided with data via a parallel communication connection 242. The parallel data signal may be provided to a parallel-to-serial converter PISO 240 which may convert a parallel data signal in a serial data signal. The resulting serial data signal may be transferred via one of the serial communication connections 220 to one of the memory buffer chips 214. Further, each processor chip may comprise a serial-to-parallel converter SIPO 238 which is configured for converting a serial data signal provided by one of the memory buffer chips 214 via one of the serial point-to-point communication connections 220 to a parallel data signal being further transferred via a wide connection 242.

Each memory buffer chip 214 may comprise a serial-to-parallel converter SIPO 252 which is configured for converting a data signal provided via one of the serial point-to-point communication connections 220 to a data signal being transferred via a parallel communication connection 256. Further, the memory buffer chip may comprise a parallel-to-serial converter PISO 254 which is configured for converting a parallel data signal provided to the processor interface unit 250 via a parallel communication connection 256 to a serial data signal being transferred via one of the serial point-to-point communication connections 220.

Figure 4:
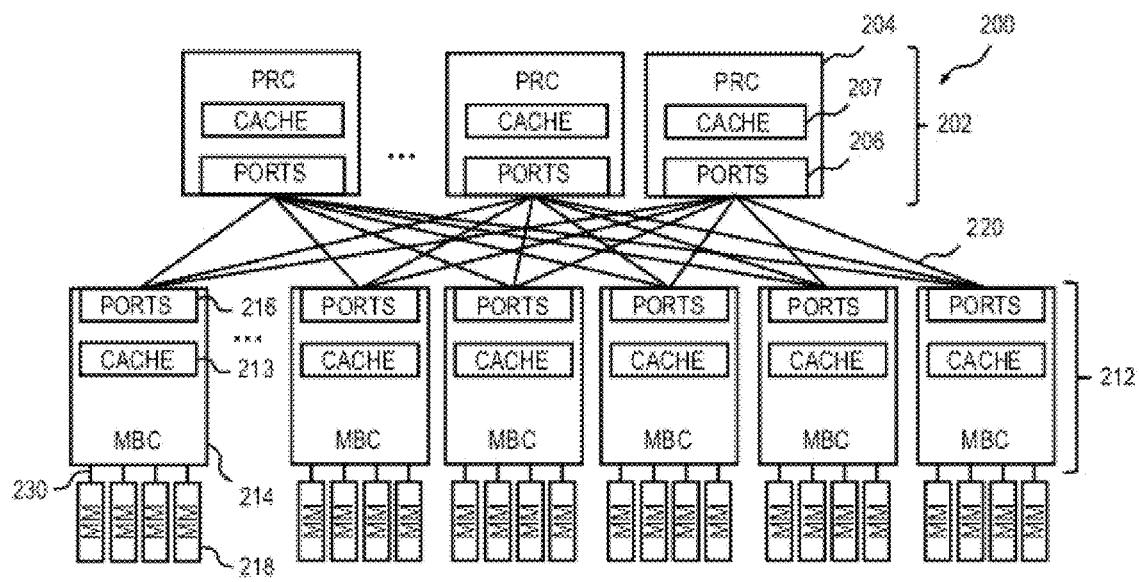
FIG. 4 depicts a schematic diagram illustrating a third exemplary uniform memory access architecture.

FIG. 4 depicts a further exemplary embodiment of a computer system 200 which corresponds to the computer system 200 of FIG. 2. The memory buffer chips 214 of the computer system 200 of FIG. 4 may in addition each comprise a cache 213 for caching memory lines stored in the memory modules 218. Thus, when trying to access one of the memory lines stored in one of the memory modules 218 by one of the processor chips 204, it may be checked whether the requested memory line (with the correct read/write rights) is cached in the cache 213 of the respective memory buffer chips 214. In case the memory line is cached, the cached memory line may be returned as a reply to the request. Thus, time and energy required to access the memory modules 218 may be saved.

Figure 5:
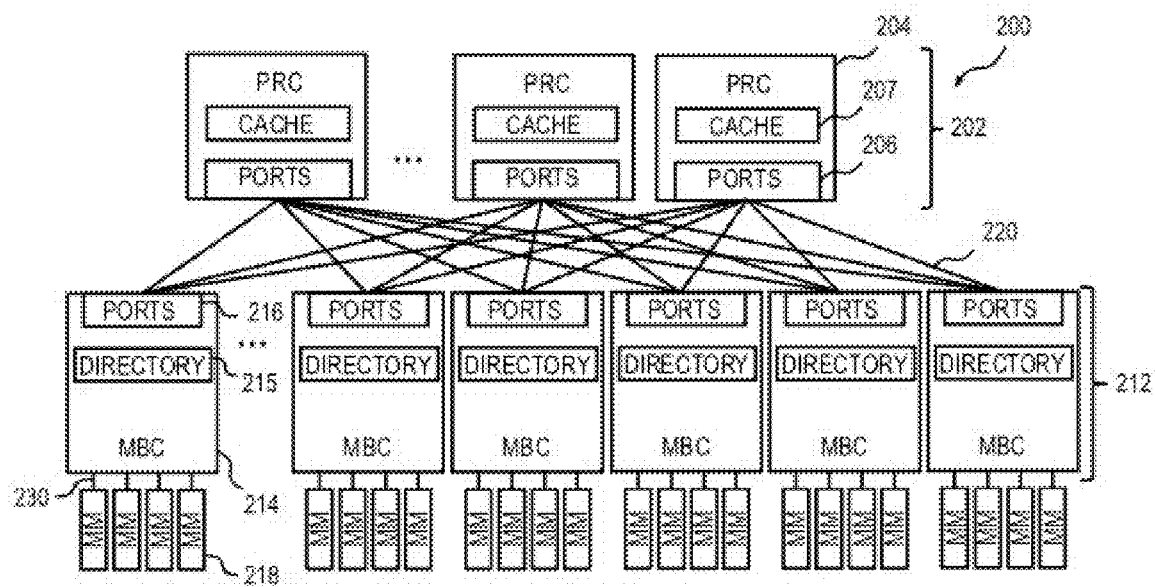
FIG. 5 depicts a schematic diagram illustrating a fourth exemplary uniform memory access architecture.

FIG. 5 depicts a further exemplary embodiment of a computer system 200 which corresponds to the computer system 200 of FIG. 2. The memory buffer chips 214 of the computer system 200 of FIG. 5 may in addition each comprise a coherence directory 215 for implementing directory-based coherence over the processor chip caches 207 for the data lines stored in the memory modules 218 local to the memory buffer chip 214 with the respective coherence directory 215. The coherence directory 215 may comprise an entry for each memory line stored in one of the memory modules 218 local to the respective memory buffer chip 214. Each of the entries of the coherence directory 215 may indicate which processor chips 204 are currently caching a copy of the memory line to which the respective entry is assigned. Furthermore, each entry may indicate the type of copy of the memory line which is currently cached by the respective processor chip 204, e.g. an exclusive write copy or a shared read copy. The coherence directory 215 may be a directory cache, where each entry is address-tagged and valid only for a memory line which is currently cached in at least one of the processor chip caches 207.

Figure 6:
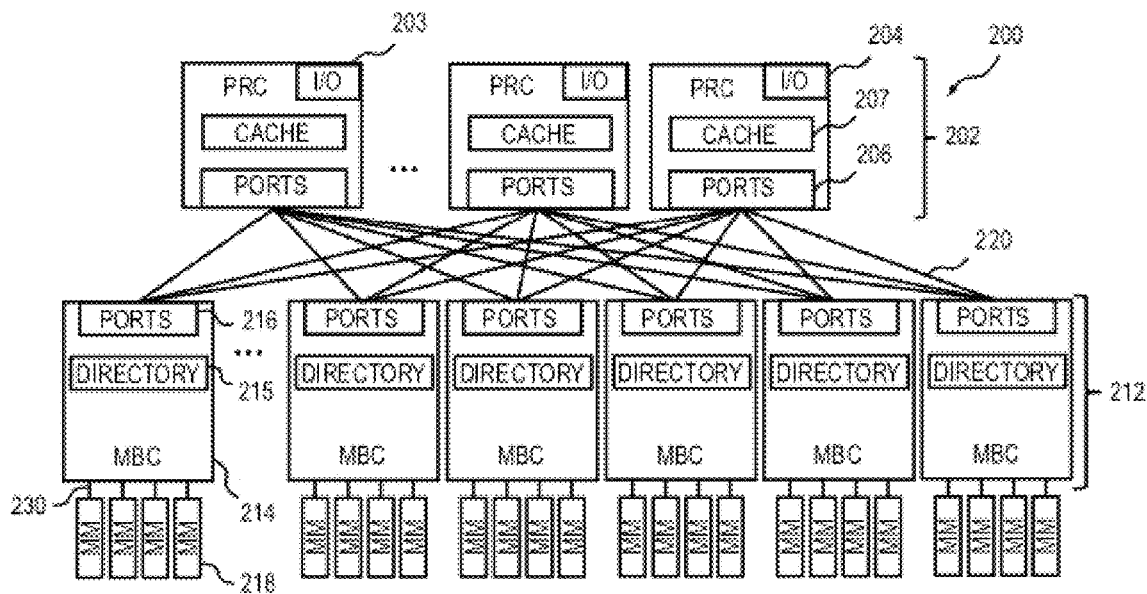
FIG. 6 depicts a schematic diagram illustrating a fifth exemplary uniform memory access architecture.

FIG. 6 shows a further exemplary embodiment of a computer system 200 which corresponds to the computer system 200 of FIG. 5. Each of the processor chips 204 of FIG. 6 comprises an I/O 203 for an I/O device which may for example be provided in form of a peripheral component interconnect express device. The system 200 may be configured for transferring memory mapped I/O commands issued by one of the processor chips 204 for an I/O device communicatively coupled to the I/O 203 of a second one of the processor chips 204 from the respective first processor chip 204 to the second processor chip 204 via one of the memory buffer chips 214, e.g. a memory buffer chip 214 being responsible for identifying the processor chip 207 of the respective I/O device.

Figure 7:
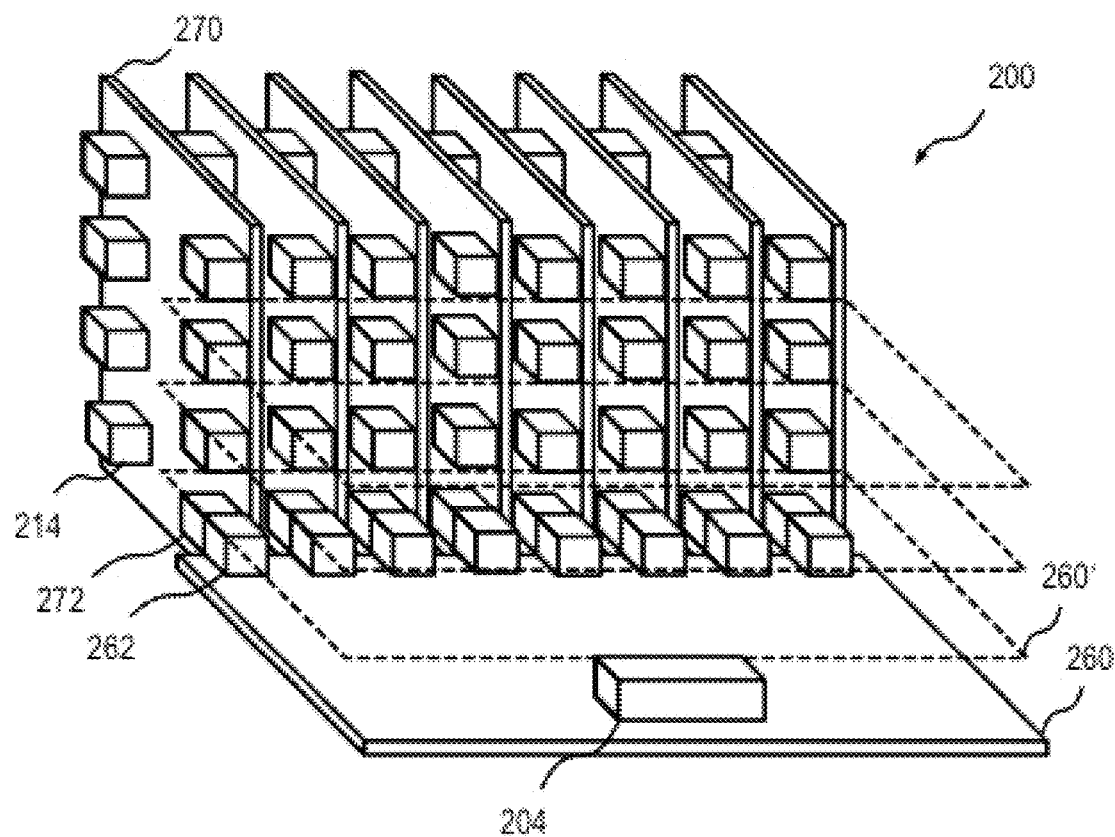
FIG. 7 depicts a schematic diagram illustrating an exemplary arrangement of the components of a uniform memory access architecture according to one of FIGS. 2-6.

FIG. 7 shows an example of a geometrical arrangement of the set of processor chips 204 and the set of memory buffer chips 214. The arrangement may for example be provided in form of a four-socket system which comprises four processor carrier elements 260 provided in form of four cards or boards. FIG. 7 shows one processor carrier elements 260, while the other three processor carrier elements 260' are indicated by dashed lines. Each processor card 260 may comprise one processor chips 204 and eight connectors 262 for connecting the processor card 260 to each of the eight memory buffer cards 270. Furthermore, a plurality of memory buffer cards 270, e.g. eight memory buffer cards 270 may be provided. Each memory buffer card 270 may comprise for example four memory buffer chips 214 and four connectors 272 each configured for establishing a connection to one of the processor cards 260 via a connector 262 of the respective processor card 260. The processor chip 204 may be communicatively coupled to each of the connectors 262 via a serial communication connection. In case of more than one processor chip 204 per processor card 260, each of the processor chips 204 may be communicatively coupled to each of the connectors 262. Further, each of the memory buffer chips 214 may be communicatively coupled to each of the connectors 272 of the same memory buffer card 270 via a serial communication connection. Thus by plugging together the processor cards 260 and memory buffer cards 270 via their connectors 262, 272 a serial point-to-point connection may be established between each of the processor chips 204 of each processor card 260 and each memory buffer chip 214 of each memory buffer card 270. By removing one or more of the processor cards 260 or one or more of the memory buffer cards 270 the number of processor chips 204 and the number of memory buffer chips 212 may easily be adjusted for a computer system 200 with a reduced processor or memory capacity.

Figure 8:
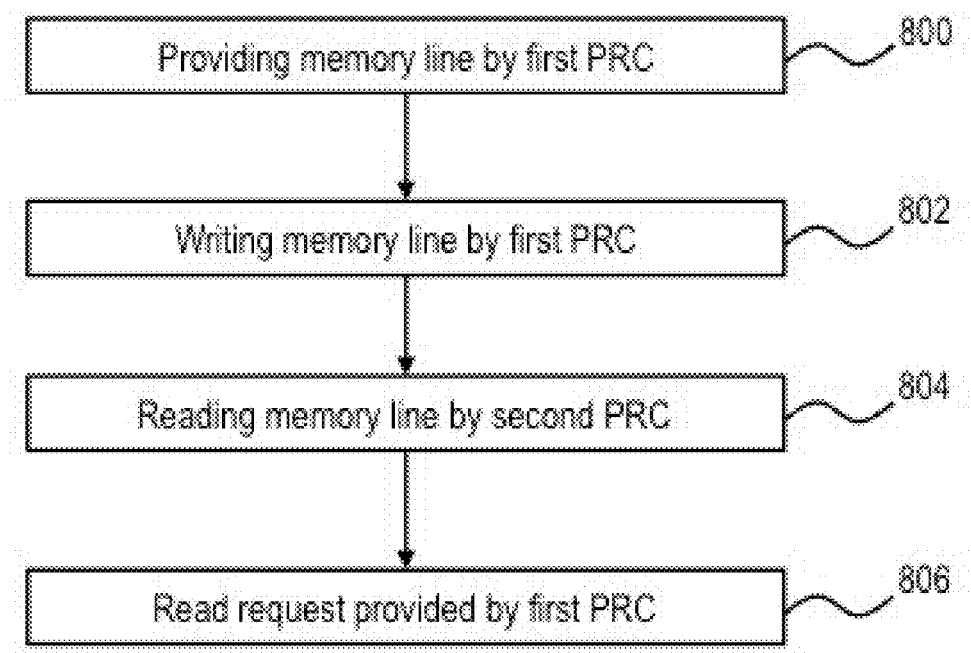
FIG. 8 depicts a schematic flow diagram illustrating a method of operating a computer system comprising a uniform memory access architecture according to one of FIGS. 2-6.

FIG. 8 shows an exemplary embodiment of a method for operating the computer system 200 according to any of the FIGS. 2-7. In block 800, a first one of the processor chips 204 may provide data to be written to a memory line of one of the memory modules 218 local to one of the memory buffer chips 214. In block 802 the first processor chip 204 may access the memory module 218 in which the respective data is to be stored and write the data to a predefined memory line. In block 804, a second memory buffer chip 204 may retrieve a copy of the memory line from the respective memory module 218 via the memory buffer chip 214 to which the respective memory module 218 is local and the serial point-to-point connection 220 between the respective memory buffer chip 214 and the second processor chip 204. The memory buffer chip 214 may comprise a coherence directory 215 implementing coherence by indicating that a copy of the memory line has been transmitted to the second processor chip 204 and is cached therein. The copy of the memory line may for example be an exclusive write copy or a shared read copy. In block 806, the first processor chip 204 may as well request a copy of the memory line. In case the first processor chip 204 requests a shared read copy of the memory line, via one of the serial point-to-point connections 220 and the memory buffer chip 214 to which the respective memory module 218 is communicatively coupled, and its coherence directory 215 indicates that the copy cached by the second processor chip 204 is a shared read copy as well, the memory buffer chip 214 may directly access the memory module 218 and retrieve the requested shared read copy of the memory line and reply to the first processor chip 204 request. In case the first processor chip 204 requests a write only copy of the memory line, the coherence directory 215 indicates that the second processor chip 204 may have to invalidate its shared read copy of the memory line before the memory buffer chip 214 replies to the first processor chip 204 request. Furthermore, the coherence directory 215 is updated accordingly.

In case the first processor chip 204 requests a shared read copy or an exclusive write copy of the memory line and the second processor chip 204 caches an exclusive write copy, which may be indicated by the coherence directory 215 of the memory buffer chip 214, the exclusive read copy must be flushed, i.e. the exclusive write copy is sent back to the memory buffer chip 214 which provides the same to the requesting first processor chip 204 and updates the memory line in the memory module 218. Furthermore, the coherence directory 215 is updated accordingly.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the disclosure may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer system with a set of processor chips comprising a plurality of processor chips and a set of memory buffer chips comprising a plurality of memory buffer chips,
   each of the memory buffer chips being communicatively coupled to at least one memory module configured for storing memory lines and assigned to the memory buffer chip,
   each of the processor chips comprising a cache configured for caching memory lines, each of the processor chips being communicatively coupled to each of the memory buffer chips via a memory-buffer-chip-specific bidirectional serial point-to-point communication connection,
   each of the processor chips being configured for transferring memory lines between the cache of the processor chip and each of the memory modules via the respective memory-buffer-chip-specific bidirectional serial point-to-point communication connection.

2. The computer system of claim 1, each of the bidirectional serial point-to-point communication connections comprising a single differential signaling pair of conductors for each direction of communication.

3. The computer system of claim 1, each of the bidirectional serial point-to-point communication connections comprising a single single-ended signaling conductor for each direction of communication.

4. The computer system of claim 1, each of the memory buffer chips being communicatively coupled to a plurality of the memory modules.

5. The computer system of claim 4, the set of processor chips being divided into a group of processor chip subsets, each processor chip subset comprising one or more of the processor chips, each processor chip subset being arranged on a subset-specific processor carrier element,
   the set of memory buffer chips being divided into a group of memory buffer chip subsets, each memory buffer chip subset comprising one or more of the memory buffer chips, each memory buffer chip subset being arranged on a subset-specific buffer carrier element,
   each processor carrier element comprising for each memory buffer carrier element a first connector assigned to a second connector of the memory buffer carrier element,
   each first connector being configured for being plugged together with the assigned second connector and for establishing all the bidirectional serial point-to-point communication connections between the one or more processor chips arranged on the processor carrier element of the first connector and the one or more memory buffer chips arranged on the carrier element of the second connector.

6. The computer system of claim 5, each of the processor chip subsets comprising the same number of processor chips.

7. The computer system of claim 5, each of the memory buffer chip subsets comprising the same number of memory buffer chips.

8. The computer system of claim 1, each of the processor chips comprising a memory interface for communicating with the memory buffer chips via the bidirectional serial point-to-point communication connections,
   the memory interface being provided with a parallel-to-serial converter for converting parallel data signals provided by the processor chip to serial data signals being transferred via the bidirectional serial point-to-point communication connections to the memory buffer chips,
   the memory interface further being provided with a serial-to-parallel converter for converting serial data signals provided by the memory buffer chips via the bidirectional serial point-to-point communication connections to parallel data signals being provided by the memory interface to the processor chip.

9. The computer system of claim 1, each of the memory buffer chips comprising a processor interface for communicating with the processor chips via the bidirectional serial point-to-point communication connections,
   the processor interface being provided with a parallel-to-serial converter for converting parallel data signals provided by the memory buffer chip to serial data signals being transferred via the bidirectional serial point-to-point communication connections to the processor chips,
   the processor interface further being provided with a serial-to-parallel converter for converting serial data signals provided by the processor chips via the bidirectional serial point-to-point communication connections to parallel data signals being provided by the processor interface to the memory buffer chip.

10. The computer system of claim 1, at least one of the memory buffer chips comprising a cache configured for caching memory lines stored in the at least one memory module assigned to the memory buffer chip.

11. The computer system of claim 10, each of the memory buffer chips comprising a cache configured for caching memory lines stored in the at least one memory module assigned to the memory buffer chip.

12. The computer system of claim 1, at least one of the memory buffer chips comprising a coherence directory and being configured for implementing directory-based coherence over the processor chip caches for memory lines stored in the at least one memory module assigned to the memory buffer chip.

13. The computer system of claim 12, each of the memory buffer chips comprising a coherence directory and configured for implementing the directory-based coherence over the processor chip caches for memory lines stored in the at least one memory module assigned to the memory buffer chip.

14. The computer system of claim 1, the system being configured for transferring a memory mapped I/O command issued by a first one of the processor chips for an I/O device communicatively coupled to a second one of the processor chips, the memory mapped I/O command being transferred from the first processor chip to the second processor chip via one of the memory buffer chips.

15. The computer system of claim 14, the I/O device being a peripheral component interconnect express device.

16. The computer system of claim 1, the number of memory buffer chips comprised by the set of memory buffer chips being larger than the number of processor chips comprised by the set of processor chips.

17. The computer system of claim 16, each processor chip comprising a number of P ports, each memory buffer chip comprising a number of H=P/X ports with P, H, and X being positive integers, each port being configured for establishing a single one of the bidirectional serial point-to-point communication connections,
- the set of processor chips comprising H/Y processor chips, the set of memory buffer chips comprising P/Y memory buffer chips with Y being a positive integer selected from the interval of 1 to X to construct a pre-selected size of computer system,
- each processor chip being communicatively coupled to each memory buffer chip by Y bidirectional serial point-to-point communication connections, each bidirectional serial point-to-point communication connection being established via a pair of ports comprising one of the P ports of the processor chip and one of the H ports of the memory buffer chip, each pair of ports being exclusively assigned to the respective bidirectional serial point-to-point communication connection.

18. The computer system of claim 17, for transferring any given one of the memory lines stored in one of the memory modules, each processor chip uses a pre-defined one of its P ports communicatively coupled via one of the bidirectional serial point-to-point communication connections to a pre-defined one of the H ports of the memory buffer chip assigned to the memory module, the pre-defined ports being assigned to the address of the memory line in the memory module,
- a coherence directory of the memory buffer chip treating each one of the H ports of the memory buffer chip as an independent participant taking part in the transfer of the memory line, when indicating active participants by which the memory line is cached, the coherence directory indicates for the memory line at most H/Y active participants.

19. A method of operating a computer system with a set of processor chips comprising a plurality of processor chips and a set of memory buffer chips comprising a plurality of memory buffer chips, each of the memory buffer chips being communicatively coupled to at least one memory module configured for storing memory lines and assigned to the memory buffer chip, each of the processor chips comprising a cache configured for caching memory lines, each of the processor chips being communicatively coupled to each of the memory buffer chips via a memory-buffer-chip-specific bidirectional serial point-to-point communication connection, each of the processor chips being configured for transferring memory lines between the cache of the processor chip and each of the memory modules via the respective memory-buffer-chip-specific bidirectional serial point-to-point communication connection,
- the method comprising:
- writing a memory line provided by the cache of a first one of the processor chip to the at least one memory module assigned to one of the memory buffer chips by directly accessing the memory buffer chip via the memory-buffer-chip-specific bidirectional serial point-to-point communication connection between the first processor chip and the memory buffer chip,
- writing a memory line provided by the cache of a second one of the processor chip to the at least one memory module assigned to the memory buffer chip by directly accessing the memory buffer chip via the memory-buffer-chip-specific bidirectional serial point-to-point communication connection between the second processor chip and the memory buffer chip.

20. Method of claim 19, the method further comprising:
- reading by the first processor chip a memory line stored in the memory module assigned to the memory buffer chip by directly accessing the memory buffer chip via the memory-buffer-chip-specific bidirectional serial point-to-point communication connection between the first processor chip and the memory buffer chip,
- reading by the second processor chip the memory line stored in the memory module assigned to the memory buffer chip by directly accessing the memory buffer chip via the memory-buffer-chip-specific bidirectional serial point-to-point communication connection between the second processor chip and the memory buffer chip.

* * * * *